UNITED STATES PATENT OFFICE.

ARCHIBALD COX, OF PLAINFIELD, NEW JERSEY, AND ARNOLD H. PETER, OF NEW YORK, N. Y.

PROCESS FOR THE EXTRACTION AND RECOVERY OF COPPER.

1,226,190.  Specification of Letters Patent.  Patented May 15, 1917.

No Drawing.   Application filed August 20, 1913. Serial No. 785,635.

*To all whom it may concern:*

Be it known that we, ARCHIBALD COX, a citizen of the United States, residing at Plainfield, in the county of Union and State of New Jersey, and ARNOLD H. PETER, a citizen of the Republic of Switzerland, residing at New York city, in the county and State of New York, have invented a new and useful Process for the Extraction and Recovery of Copper, of which the following is a specification.

This invention relates to the extraction, separation or recovery of copper from other substances, and particularly ores or residues. The materials to which the process may be applied comprise copper-bearing substances generally, and the process is of particular value in recovering the copper from substances from which (under present metallurgical practice) the metal is not extracted by mechanical extraction. It may be used to advantage, for example, in recovering the metal from slimes or tailings, or the like. For convenience all substances containing copper or its compounds are hereinafter referred to as ore, and the term copper-content is used to embrace the diversified forms in which the copper may be presented, including both free copper and copper compounds.

The recovery of copper from ore presents problems which have not heretofore been satisfactorily solved. The fact that the copper is often found in the form of diversified compounds, particularly, has presented a complexity of difficulties, with the result that the known means of dealing therewith have either been inefficient for extraction or, if theoretically efficient in that regard, have been unsatisfactory or impracticable because of difficulties connected with apparatus, by-products or cost.

To get the best results most economically it is desirable that all or substantially all the diversified forms of copper in the copper-content of the ore should be brought into solution in a way which also exerts a selective action, where needed, to prevent the other metals, which may be presented with the copper, interfering with the success of the process.

According to the present invention, the copper-content of the ore is treated to bring it to a form wherein it responds satisfactorily to a suitable solvent and dissolved in the solvent, the same treatment serving also to accomplish in a sufficient degree, where needed, the selective action. The copper-content is treated to convert it to copper-sulfid (or sulfids) readily soluble in cyanid solution and dissolved in cyanid solution.

The particular manner in which the copper-content of the ore is best treated to convert it to copper-sulfid (or sulfids) depends upon the particular ore, the form or forms in which the copper is found in it, the other substances which it may contain, and the circumstances surrounding the particular treatment. Any way of treating the copper-content of the ore to convert it to copper-sulfid (or sulfids) will answer more or less and represents an embodiment of the invention within some of the claims hereinafter made.

The treatment to convert to copper-sulfid (or sulfids) may be accomplished by the use of a sulfur-yielding substance in the form of a compound soluble in liquid (as, for example, monosulfid or polysulfid) or by presenting the sulfur in its elemental form (as, for example, by causing volatilized sulfur to pass through the ore) or in the form of a gaseous compound (as, for example, by passing sulfureted hydrogen through the ore) without departing from the invention in its broader aspects, which embrace any way of converting the copper-content to copper-sulfid (or sulfids).

For example, taking the case of an ore containing little or no sulfur (free or in compounds) either as part of the copper-content or otherwise, say as an extreme illustration an ore containing only pure metallic copper, one convenient way is to treat with a solution, using as the sulfur-yielding substance therein a polysulfid. This treatment, where other circumstances permit, may be conveniently accomplished by grinding or crushing the ore in the solution instead of in water; and enough agitation to secure contact (and, where necessary, repeatedly remove the sulfid scale or crust from the surface of exceptional particles of the copper content) is desirable. To take another example: In the case of a copper-content comprising a large proportion of copper-sulfids or ores containing sulfur or sulfur-yielding substances, it may be more convenient (if treating with a sulfur-yielding substance in solution) to use a monosulfid, as, for instance, sodium monosulfid. And in some instances the nature of the ore and its content may be such that the sulfur (free or in compounds) contained therein may be used (by treatment with an alkali, volatilization or otherwise) to produce the copper-sulfid (or sulfids).

Effecting the treatment to convert to copper-sulfid by using a solution containing a sulfur-yielding substance is particularly indicated when the ore contains other substances necessitating a selective action best performed by ancillary dissolution. For example, in the case of ores containing antimony, arsenic or tin, the treatment with a separate solution containing a sulfur-yielding substance before cyaniding is desirable, because the antimony or arsenic or tin is thus converted to its sulfid, dissolved in the solution, and withdrawn with it. When zinc, iron, bismuth or cadmium is present, the treatment should preferably be such as to convert those present to their sulfids in order that they may not impair the cyanid solution or interfere with the process, and this may in many cases be conveniently accomplished by treatment in a solution of sulfur-yielding substances before cyaniding, but other treatments for converting to sulfids may be indicated in the case of ores containing with the copper content iron, zinc, bismuth or cadmium, such treatments preferably for the best results preceding contact with the cyanid.

As a further example of the treatment, in the case of ores which contain a considerable amount of sulfur or in cases where a supply of sulfur is otherwise readily available, and particularly in such cases where a suitable filter-press, or the like, is available, it may be most convenient to cause volatilized sulfur to pass through the ore, as, for example, while it is in the filter-press before cyaniding.

The exact manner in which the copper-sulfid (or sulfids) is best treated with the solvent also depends upon the balance of a variety of considerations. Chemically, it is, of course, important that the treatment to convert to copper-sulfid (or sulfids) precede the dissolution in cyanid solution, but that may occur in some instances in a sufficient degree even when the sulfur-yielding substance and the cyanid are presented in the same solution. In such cases the chemical conditioning or conversion to sulfid will precede the cyaniding sufficiently, although the two actions from a mechanical point of view appear accomplished by one treatment. It is, moreover, practicable to use such an exact amount of sulfur or sulfur-yielding substance that the sulfur will be so far exhausted in the conditioning or conversion to sulfids as to leave the solution ready for the introduction of cyanid therein. Generally speaking, it is preferable to condition or convert to sulfids as a distinct mechanical operation before subjecting the sulfids to the solvent, although it is enough if the conditioning precede the dissolution chemically; and here also practical considerations may be important.

For example, in the case of an ore and its copper-content which together contain little sulfur (free or in compounds) it is ordinarily best to treat to convert to copper-sulfid (or sulfids) in an operation separate from the cyaniding, particularly if any loss of cyanid or a pure solution of copper-sulfid in the solvent is desired, and from a purely chemical point of view the separation into two operations is in such cases plainly indicated, but in some instances of this kind practical considerations may be controlling and render it preferable to convert to sulfid and subject to cyanid in the same solution. So in cases where less available sulfur need be supplied, the sulfur-yielding substance or agent instrumental in conversion may be introduced in the cyanid solution, but even in instances of this kind the purely chemical considerations may be allowed to control or other considerations, as, for example, the method used to effect the recovery from the solution may indicate separate operations.

As specific illustrations of the process, the following are mentioned: Two ounces of slime containing 2.1% of copper, together with iron and other elements, may be treated with 100 cc. of a solution containing the poly-sulfid resulting from boiling four grams of sodium mono-sulfid and 1.4 grams of sulfur, the solution withdrawn, taking pains to avoid oxidation, and the sulfidized ore treated with a two per cent. solution of cyanid of potassium, with the result that all the copper and all the cyanid may be recovered in the manner hereinafter pointed out. Or two ounces of slime containing two per cent. of copper and no iron may be treated with 100 cc. of a solution containing three grams of monosulfid and three grams of cyanid and the copper precipitated as copper sulfid and recovered without loss of cyanid, as hereinafter pointed out.

Thus the invention provides for bringing the copper-content of the ore into solution in a way which has the advantage of great adaptability to varying conditions. Its simplicity and elasticity make it adaptable to many different apparatuses and even to some existing installations. The ore may be introduced, in open or closed vessels, with or without air, to a solution containing a sulfur-yielding substance, as a polysulfid or monosulfid, and after treatment therein (preferably with agitation) the solution withdrawn and a solution of cyanid (say two per cent. cyanid of potassium or cyanid of sodium) introduced until the copper-sulfid (or sulfids) is dissolved. Or the ore may be introduced into a solution containing both the cyanid and sulfur-yielding substance or agent instrumental in the conversion with sufficient stirring to insure contact and the copper allowed to form copper-sulfid (or sulfids) and enter the solution. Or volatilized sulfur (free or in compounds) may be passed through the ore and the copper-content thus conditioned subjected to cyanid solution. Or the copper-content may be otherwise treated to convert it to copper-sulfid with dissolution thereof in cyanid solution. Whatever way may be adopted for accomplishing it, the important point is to condition the copper-content by treating to convert it to copper-sulfid (or sulfids) and subject it to the solvent.

It is to be observed that the invention thus provides for bringing the copper-content of the ore into solution in open or closed vessels, with or without air, without much regard to exact proportions or precise conditions of temperature, and the like, and with satisfactory rapidity; and the solution is of such a character that apparatus of iron, concrete or other convenient material may be used without injury or serious deterioration.

The separation of the solution from the copper-barren ore is chiefly a matter of operative convenience and not essential to the invention in its broader aspects. The separation may be accomplished by settling or by decantation, by pressure or vacuum filters, or by centrifugals or other means suitable for separating liquid from solids.

The recovery of the copper from the solution may be accomplished in any one or more of a variety of ways. For example, methods of cementation or evaporation or electrolysis may be used. In many cases we prefer to effect the recovery from the solution of copper-sulfid (or sulfids) and cyanid as follows:—To the cyanid solution, acid, preferably just enough sulfuric acid to neutralize the alkali of the alkali cyanid, is added, which results in a copious precipitant of copper-sulfid. The copper-sulfid by treatment in a closed apparatus may be made to furnish the sulfuric acid and leave copper and copper oxids, which may be readily refined. The solution left after the copper-sulfid has been removed, containing hydrocyanic acid in solution, is neutralized by the addition of an alkali, restoring the cyanid, and is ready for use, the alkali-sulfate which is also formed therein eventually crystallizing out. It is accordingly unnecessary to effect complete precipitation. When this method of recovery is used the vessel containing the solution is preferably kept closed.

Instead of recovering sulfuric acid from the copper-sulfid, in many cases we prefer to proceed as follows:—The alkali sulfate is recovered from the solution by crystallization. Upon redissolving these crystals and electrolyzing, the sulfuric acid is recovered on the anode and the alkali on the cathode. Thus the acid for precipitating and the alkali for restoring the cyanid are cyclically supplied. The copper-sulfid produced by the process is of such purity as to permit of successful treatment by means of ferric sulfate solution according to the equations:—

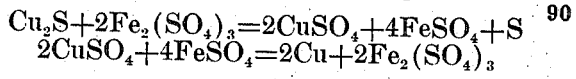

$$Cu_2S + 2Fe_2(SO_4)_3 = 2CuSO_4 + 4FeSO_4 + S$$
$$2CuSO_4 + 4FeSO_4 = 2Cu + 2Fe_2(SO_4)_3$$

The sulfur, filtered off, according to the first equation, may be used to supply sulfur to combine with the copper-content of the ore to form the copper-sulfid (or sulfids), by using it to form the alkali-sulfid solution or otherwise. When so practised the process represents a cycle with the advantages, as to cost and otherwise, of cyclical operations.

The invention is believed to provide for the first time a satisfactory wet process for the extraction and recovery of copper from many ores.

We claim:—

1. A process for extracting and recovering copper from ore, comprising converting the copper-content into copper-sulfid (or sulfids), dissolving the copper-sulfid in cyanid solution, and recovering the copper from the solution.

2. A process for extracting and recovering copper from ore, comprising converting the copper-content of the ore to copper-sulfid (or sulfids), dissolving the copper-sulfid, and recovering the copper from the solution.

3. A process for extracting and recovering copper from ore, comprising treating the copper-content with a sulfur-yielding substance in solution, dissolving in cyanid solution, and recovering the copper from the solution.

4. A process for extracting and recovering copper from ore containing also other metals, comprising converting the metal-content of the ore to sulfids, dissolving the copper sulfid in a selective solution which does not readily dissolve the other sulfids and recovering the copper from the solution.

5. A process for bringing the copper content of ore into solution, comprising converting the copper content to copper sulfid (or sulfids), and dissolving the copper sulfid in a suitable solution.

In witness whereof, this specification is signed in the presence of two witnesses.

ARCHIBALD COX.
ARNOLD H. PETER.

Witnesses:
 HERMAN GUSTOW,
 ALFRED M. HOUGHTON.